Jan. 13, 1970   S. S. TOMTER   3,489,614
GAS DISTRIBUTION MEANS FOR ELECTROCHEMICAL CELLS
Filed Sept. 28, 1964   2 Sheets-Sheet 1

Inventor
Scott S. Tomter
By Donald C. McLoughey
Attorney

Jan. 13, 1970    S. S. TOMTER    3,489,614
GAS DISTRIBUTION MEANS FOR ELECTROCHEMICAL CELLS
Filed Sept. 28, 1964    2 Sheets-Sheet 2
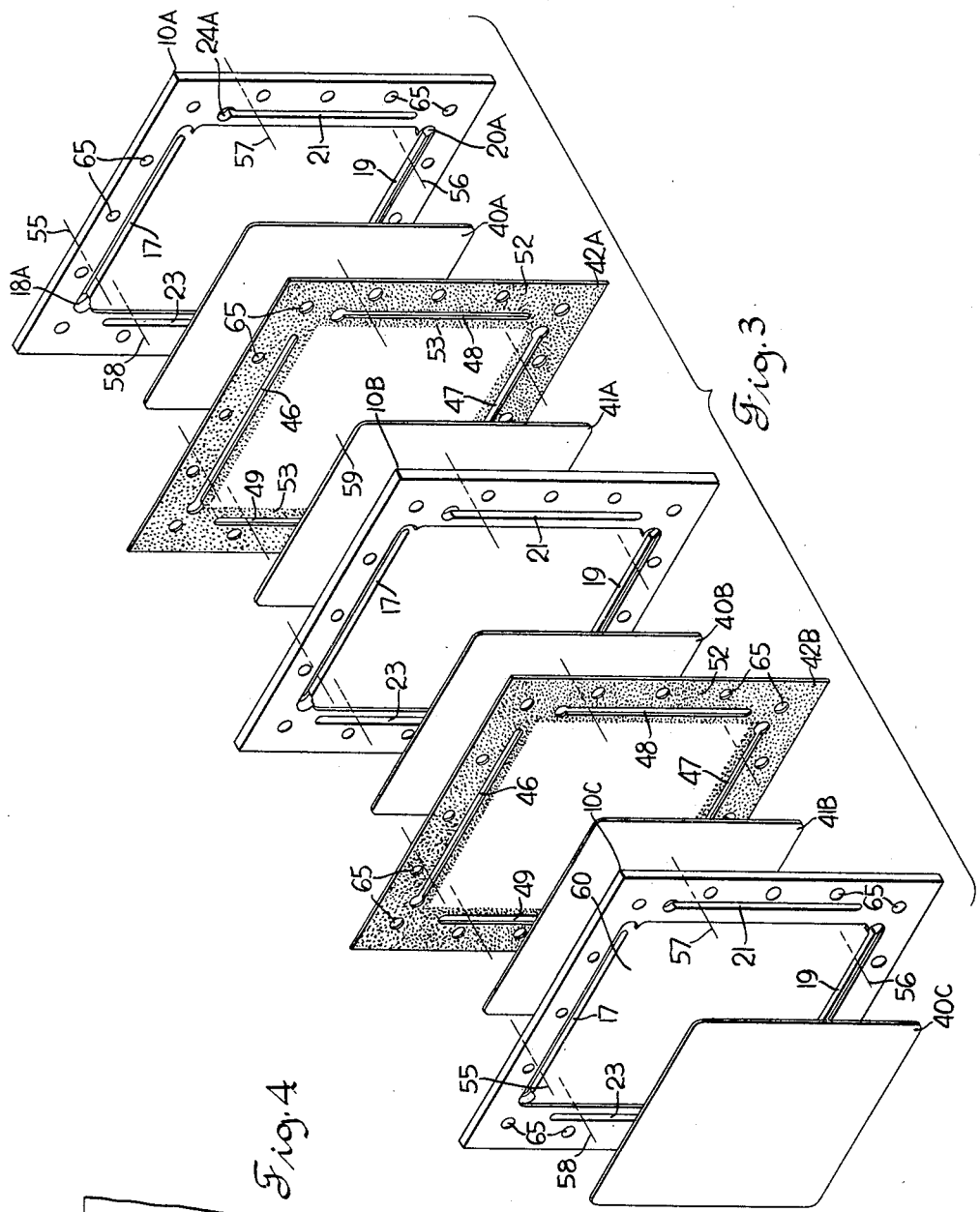
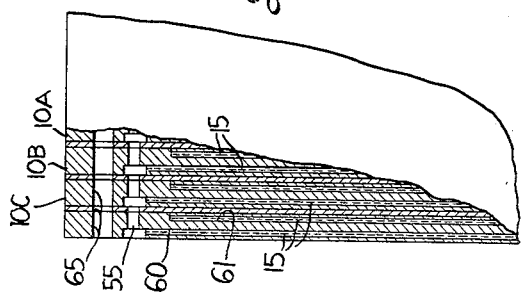
Inventor
Scott S. Tomter
By Donald C. M. Gumfrey
Attorney

United States Patent Office 3,489,614
Patented Jan. 13, 1970

3,489,614
GAS DISTRIBUTION MEANS FOR ELECTROCHEMICAL CELLS
Scott S. Tomter, Milwaukee, Wis., assignor to Allis-Chalmers Manufacturing Company, Milwaukee, Wis.
Filed Sept. 28, 1964, Ser. No. 399,727
Int. Cl. H01m 27/04
U.S. Cl. 136—86        5 Claims

ABSTRACT OF THE DISCLOSURE

An electrode backing plate for an electrochemical cell having a depressed area on each face thereof to receive a pair of electrodes and having means to space each electrode from the base surface of each depressed area. Two pairs of elongated slits are provided through the periphery of the backing plate, such that the elongated edges of one pair of slits communicate with one of the depressed areas at opposing edges, and the elongated edges of the other pair of slits communicate with the other depressed area at opposing edges.

---

This invention relates to electrochemical cells. More particularly this invention relates to reactant supply means in such cells. In particular this invention relates to electrode backing plates often referred to as electrode holders that provide for the uniform distribution of reactant fluids over reaction sites within electrochemical cells.

Electrochemical cell, as that term is used herein, refers to those devices having at least two electrodes paired in spaced apart relation for chemical reaction. The chemical reaction involves oxidation at the anode electrode, and reduction at the cathode electrode. These chemical species taking part in the oxidation-reduction reaction may be present in the electrolyte, be supplied as a fluid to the electrode, or consist of the electrode itself. Cells in which my invention is suitable are those having at least one chemical reactant supplied as a fluid, and particularly as a gas to at least one of the electrodes.

Depending on whether the chemical reaction is or is not spontaneous, an electrochemical cell will either produce or consume electrical energy. If electrical energy is produced, so long as fresh reactants are supplied, the cell is known as a fuel cell.

In the following description of my invention, I shall refer to fuel cells as an example of one embodiment of an electrochemical cell within which the electrode holder of my invention can be used to advantage. One should understand, however, that my invention is applicable to other electrochemical cells wherein one desires an even flow of reactive fluid over the electrode surface.

In the typical individual fuel cell, a reactant, referred to as the fuel, that is oxidizable with respect to some oxidant is supplied to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

In practice, several individual fuel cells are coupled in cooperative electrical connection to obtain the desired output. A plurality of electrochemical cells so connected are known as a module.

The designs of existing electrode holders have proven deficient in providing for the uniform distribution of fluid reactants. I found that in existing electrode holders the reactant fluid swirls about the periphery of the electrode without a sufficient volume of fluid reaching the central portion of the electrode.

Accordingly, the general object of this invention is to provide an electrode backing plate for electrochemical cells that uniformly distributes reactant fluid.

A further object of this invention is to provide an electrode backing plate that distributes reactant fluid independently of any grooved structure upon the electrode receiving surface of the backing plate.

A still further object of my invention is to provide an electrode backing plate that when included in a fuel cell module, automatically equalizes the supply pressure between electrodes.

Another object of my invention is to provide a fuel cell backing plate for electrical series or parallel connection that requires neither external nor individual connection of gas supply lines to the electrodes.

Still another object of my invention is to provide a fuel cell backing plate that has integrated within its construction the manifold lines necessary to supply the gaseous reactants, and thus when included in a module provides a compact unit with a high energy to volume ratio.

Briefly, my invention entails providing a backing plate having a pair of elongated slit openings for the inflow and outflow of reactant fluid and exhaust products. When assembled into a module, the slits of each plate are in alignment and are sealed in cooperative relationship one against another so as to form a pair of fluid tight plenum chambers. One plenum chamber provides a passageway for the supply of fresh reactant fluid, and the other plenum chamber serves as a passage for the exhaust of spent fluid and exhaust products. As shall be seen later, the plenum chambers of my invention insure that the fluid pressure and quantity supplied to each cell is equalized as in the flow over the surface of each individual electrode.

The novel features which are considered as characteristic for the invention are set forth in particular in the appended claims. The invention itself, however, both as to its construction and method of operation, together with additional objects and advantages will be best understood from the following description of specific embodiments, when read in conjunction with the accompanying drawings in which:

FIG. 3 illustrates, in an exploded isometric view, the essentials of a portion of a fuel cell module assembled for electrical series operation including one embodiment of my invention which is a bipolar electrode holder; and FIG. 4 is a cross section section through the center of a portion of the assembled module shown in FIG. 3 to illustrate especially a preferred type of separation means.

Figure 1:
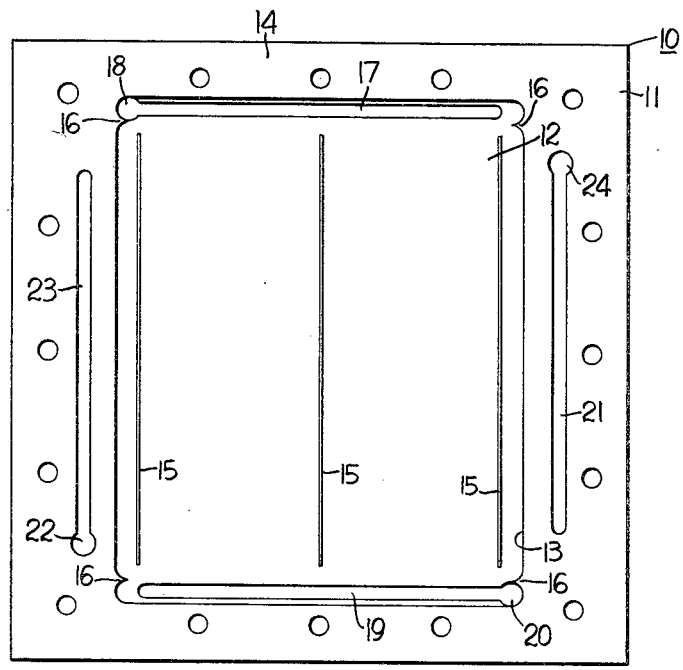
FIG. 1 is a plan view of one surface of the electrode holder plate of my invention intended for bipolar operation.
Figure 2:
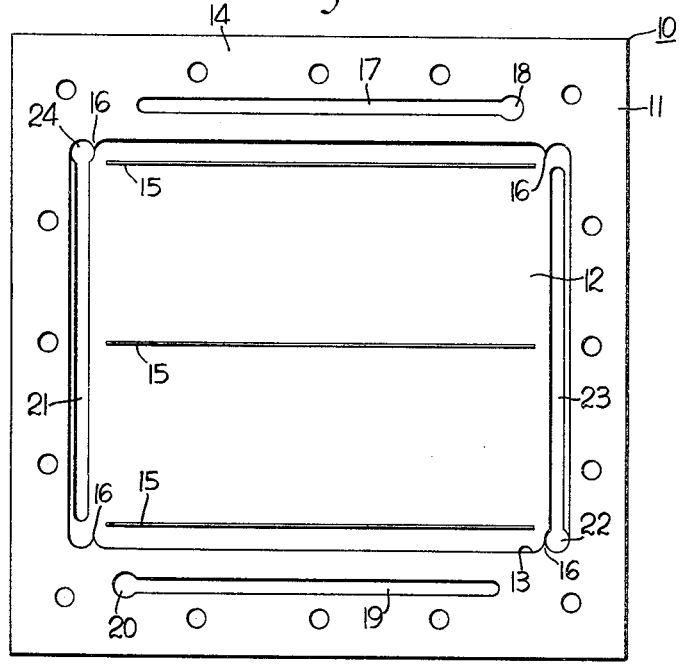
FIG. 2 depicts a plan view of the obverse surface to the electrode holder plate shown in FIG. 1.

Referring to the drawings, and in particular to FIGS. 1 and 2, the construction of the electrode backing plate 10 of my invention will be explained in detail. Plate 10 is, of course, constructed from a material that is chemically inert toward reactants, products or other substances it may contact, and is either made from an electrically conductive material or has means included within its structure to conduct an electrical current to or from electrodes. A suitable plate 10 can be made, for example, from nickel or if a lighter weight plate is desired, it can be made from magnesium plated with nickel. I have chosen nickel because of its well known resistance to aqueous alkali hydroxides that many find especially well suited for use as fuel cell electrolytes.

Structurally, electrode backing plate 10 comprises a frame portion 11 having a central depressed area 12. Frame portion 11 extends about the entire periphery of plate 10, its inner perimeter 13 delineating the boundary of depressed area 12. As shall appear later, depressed area 12 provides a recessed seat below the planar surface 14 of frame portion 11 for receiving and holding an electrode in operative position.

Spacing means 15 is provided between the base surface of depressed area 12 and the electrode so as to achieve a separation between these parts. The space 60, 61 (shown in FIG. 4) provided by this separation, provides room to distribute reactive gases over the electrode surface.

Separation means 15, can, for example, be a slightly raised ridge within the depressed area as illustrated in FIGS. 1 and 2. I find, however, that a particularly advantageous separation means 15 is a chemically inert screen, made for example from nickel or polypropylene, mesh, as shown in FIG. 4. This screen is congruent to the electrode.

The embodiment of the electrode holder of my invention, as shown in the drawings, assumes a square shape and the electrode held therein is rectangular. Clearly, however, the exact shape or dimensions of the electrode and electrode holder are immaterial so long as the teachings set forth below as to the novel means of supplying reactant gas to the electrodes are followed.

There are located about the electrode holder, plate 10, a number of slits 17, 19, 21 and 23. It is important that these slits extend along, and be substantially parallel, to the edge of an electrode. The electrode lying within depressed area 12 can be held in place by the recession of perimeter 13 and the inwardly jutting portions 16. It is important that the electrode not extend beyond adjacent jutting portions 16 to cover a slit opening in plate 10. Each slit, as shown in the drawings, terminates in an enlarged opening 18, 20, 22 and 24. These enlarged openings are not required for the functioning of the reactant feeding, but merely aid in the machining of the plate.

The depressed area 12 has a rectangular shape. The embodiment herein described is of a bipolar electrode holder. Thus, the depressed area 12 within one side of plate 10 (shown in FIG. 1) is offset by rotation of 90° about an axis perpendicular to the drawing from the rectangular depressed area within opposite side of plate 10 (shown in FIG. 2).

Referring now to FIG. 1, showing one side of a bipolar plate 10, slits 17 and 19 open into depressed area 12. Slit 17 provides an inlet for a reactant gas, while slit 19 provides an outlet for spent gases. Slits 21, 23 open into the frame portion of this face of plate 10 and do not communicate with the central area 12 of the surface of plate 10 shown in FIG. 1.

Referring now to FIG. 2, slits 21, 23 here open into the depressed central portion 12 of plate 10. Slit 21 provides an inlet for another reactant while slit 23 provides an outlet for exhausting spent gases. Thus, it will be appreciated that a bipolar plate 10 has about its periphery reactant supply and exhaust means for servicing an anode and a cathode electrode.

It should now be apparent that in the event backing plate 10 is intended for holding unipolar electrodes, the depressed area 12 is not rotated 90° about the axis perpendicular to the plane of the drawing. One pair of slits, for example 17, 19 open into the depressed area of both faces of plate 10, while the other pair 21, 23 is located entirely with frame portion 11.

Now that the individual backing 10 has been described, it will be helpful in the understanding of my invention to consider the cooperation of a plurality of such backing plates with each other and with the other parts of a fuel cell module.

With reference to FIGS. 3 and 4, the operation of a hydrogen-oxygen fuel cell module incorporating my electrode backing plate 10 further illustrates the plenum chamber feature of my invention. In the drawings, only a portion of the entire module is shown within the bracket of FIG. 3; the remainder of the module being a duplication of the parts shown. Two complete cells, cell A and cell B are included together with a portion of a third incomplete cell, cell C.

Each cell, for example cell A, comprises a pair of conventional fuel cell electrodes 40A, 41A, one electrode 40A being the fuel electrode, and the other electrode 41A being the oxidant electrode. For the purpose of preserving a gas seal between adjacent electrodes, the surface of the electrode held within depressed area 12 is desirably substantially coplanar with surface 14. A suitable electrode is formed from sintered nickel, and can carry any of the many known catalysts that activate fuel cell reactants.

These two electrodes 40A, 41A are spaced by an electrolyte containment means 42A. Although any of the known conventional means for carrying and containing an electrolyte is suitable, such for example as a single or double wall ion exchange membrane, I prefer a sheet of fibrous asbestos.

Means 42 desirably has the same outside dimensions as plate 10, and must include slit openings which coincide with the slit openings in plate 10. It will be noted that the asbestos sheet means 42 is congruent to backing plate 10, slit openings 46, 48, 47, 49 coinciding with slit openings 17, 21, 19, 23 respectively. For convenience, the bolt holes 65 upon plate 10, and means 42 are also in alignment. The outer periphery 52 of asbestos sheet 42 is wetproofed to make it impervious to the passage of fluids. It is important that the strip, for example strips 53 upon means 42A, between the slit and the central electrolyte carrying portion 59 of means 42 be so treated to prevent cross manifold leakage of reactant gases. In the drawings, stippling is used to indicate the area upon means 42 that has been treated with a paraffin wetproofing agent.

During operation, hydrogen fuel and oxygen oxidant are fed from suitable sources to the cell. The central area of asbestos sheet means 42 is saturated with a suitable electrolyte. Plate 10A being an end plate has only its inner surface fitted to receive electrode 40; the opposite surface (not shown) is smooth and being backed by a flat sheet, the only openings therein corresponding to openings 18A, 20A, 24A, 22A in plate 10A. Plate 10A and the flat sheet serve as one end wall of the module. The other end wall is not shown, but would as is now apparent, be a plate 10 fitted to receive only electrode 41.

Hydrogen can be fed through an appropriate feedline coupled to opening 18A in end plate 10A. The hydrogen diffuses through plenum chamber 55 formed by the cooperation of slits 17 in plates 10A, 10B, 10C and slits 46 in means 42A, 42B.

The hydrogen fuel is in this fashion made available at an equal pressure and velocity to each fuel electrode 40 in the module. The hydrogen flows from the plenum chamber into space 60 provided by spacing means 15. Because the plenum chamber extends across the entire edge of electrode 40, it flows evenly without turbulence over the entire surface of the electrode.

The hydrogen reacts in the usual fashion at each electrode 40 and the exhaust products together with unreacted hydrogen are removed through plenum chamber 56 formed by the cooperation of slits 19 in plates 10A, 10B, 10C and slits 47 in means 42A, 42B. The waste gases are removed from the cell through a line attached to opening 20A in plate 10A.

Similarly, oxygen can be fed through an appropriate feedline to opening 24 in end plate 10A. The oxygen will diffuse into the plenum chamber 57, formed by the co-operation of slits 21 in plates 10A, 10B, 10C, and slits 48 in means 42A, 42B. The oxygen flows from plenum chamber 57 into space 61 and flows over each electrode 41. Any exhaust products and unreacted oxygen are removed through plenum chamber 58 formed by the co-operation of slits 23 in plates 10A, 10B, 10C and slits 49 in means 42A, 42B, and thence through opening 22A in plate 10A.

In this manner I have provided for the streamline flow of reactant fluids, especially gases, over electrode surfaces without deadpots upon the electrode. Immaterial variations of my invention will become apparent to those skilled in the art upon reading the foregoing specification and such variations, together with numerous other advantages will be understood not to constitute a departure from the underlying principle or idea of my invention within the scope of the appended claims.

The embodiments of the invention in which an exclusive property or privilege is claimed are defined as follows:

1. An electrode backing plate for an electrochemical cell comprising a conductive plate having a first depressed area in the central portion of one face to receive a first electrode, and a second depressed area in the central portion of the other face to receive a second electrode; a frame portion surrounding each of said depressed areas; a first pair of elongated slits extending through said frame portion transverse to said first depressed area with the elongated sides substantially parallel to opposing edges of said first depressed area and substantially equal in length to said opposing edges, said first pair of elongated slits communicating with said first depressed area substantially along the entire length of said opposing edges of said first depressed area; and a second pair of elongated slits extending through said frame portion transverse to said second depressed area with the elongated sides substantially parallel to opposing edges of said second depressed area and substantially equal in length to said opposing edges, said second pair of elongated slits communicating with said second depressed area substantially along the entire length of said opposing edges of said second depressed area.

2. An electrode backing plate according to claim 1 further comprising a first means for spacing the first electrode from the base surface of said first depressed area, and a second means for spacing the second electrode from the base surface of said second depressed area.

3. An electrode backing plate according to claim 1 wherein said first and second depressed areas are substantially rectangular; and said first pair of elongated slits are substantially equal in length to, and adjacent to, two opposing sides of said first rectangular depressed area; and said second pair of elongated slits are substantially equal in length to, and adjacent to, two opposing sides of said second rectangular depressed area, said second pair of elongated slits being rotated 90° from said first pair of elongated slits.

4. An assembly adapted for cooperation with like assemblies to construct an electrochemical module; said assembly comprising an electrode backing plate having a first depressed area in the central portion of one face and a second depressed area in the central portion of the other face with a frame portion surrounding each of said depressed areas; a first pair of elongated slits extending through said frame portion transverse to said first depressed area with the elongated sides thereof adjacent to opposing edges of said first depressed area and substantially equal in length to said opposing edges, each of said first pair of elongated slits communicating with said first depressed area substantially along the entire length of the adjacent opposing edge of said first depressed area; a second pair of elongated slits extending through said frame portion transverse to said second depressed area with the elongated sides thereof adjacent to opposing edges of said second depressed area and substantially equal in length to said opposing edges, each of said second pair of elongated slits communicating with said second depressed area substantially along the entire length of the adjacent opposing edge of said second depressed area; a first electrode deposed within said first depressed area, a first means for spacing said first electrode from the base surface of said first depressed area; a second electrode deposed within said second depressed area; and a second means for spacing said second electrode from the base surface of said second depressed area.

5. An assembly according to claim 4 wherein said first and second means for spacing said first and second electrodes from the base of said first and second depressed area respectively comprises a screen.

References Cited

UNITED STATES PATENTS

| | | | |
|---|---|---|---|
| 2,897,130 | 7/1959 | Dorsser et al. | 204—180 |
| 2,969,315 | 1/1961 | Bacon | 136—86 |
| 3,012,086 | 12/1961 | Vahldieck | 136—86 |
| 3,297,484 | 1/1967 | Niedrach | 136—86 |
| 3,320,092 | 5/1967 | Uline | 136—86 |

WINSTON A. DOUGLAS, Primary Examiner

H. A. FEELEY, Assistant Examiner

U.S. Cl. X.R.

136—120; 204—256